United States Patent [19]
Kim

[11] Patent Number: 5,828,515
[45] Date of Patent: Oct. 27, 1998

[54] AUTOMATIC SERVO CONTROL GAIN COMPENSATION TECHNIQUE FOR HARD DISK DRIVE

[75] Inventor: Gwan-Il Kim, Sungnam, Rep. of Korea

[73] Assignee: SamSung Electronics Co., Ltd., Suwon, Rep. of Korea

[21] Appl. No.: 756,336

[22] Filed: Nov. 26, 1996

[30] Foreign Application Priority Data

Nov. 27, 1995 [KR] Rep. of Korea .................. 1995-43969

[51] Int. Cl.$^6$ ................................................ G11B 5/596
[52] U.S. Cl. ..................................... 360/78.06; 360/78.09
[58] Field of Search ........................... 360/78.04, 78.05, 360/78.06, 78.09, 78.14; 369/44.27, 44.28, 44.29

[56] References Cited

U.S. PATENT DOCUMENTS

| | | | |
|---|---|---|---|
| 4,184,108 | 1/1980 | Sordello et al. | ...................... 360/78.04 |
| 4,611,317 | 9/1986 | Takeuchi et al. . | |
| 4,616,353 | 10/1986 | Kaneda et al. . | |
| 4,679,103 | 7/1987 | Workman | .............................. 360/78.14 |
| 4,878,135 | 10/1989 | Makino et al. | ....................... 360/78.04 |
| 5,107,479 | 4/1992 | Tsuyuguchi et al. . | |
| 5,124,967 | 6/1992 | Isaka et al. . | |
| 5,138,594 | 8/1992 | Fennema et al. | ..................... 369/44.29 |
| 5,293,365 | 3/1994 | Rokutan . | |
| 5,347,502 | 9/1994 | Yamada et al. . | |
| 5,399,849 | 3/1995 | Jung . | |
| 5,416,759 | 5/1995 | Chun . | |
| 5,436,877 | 7/1995 | Ohshima . | |
| 5,510,939 | 4/1996 | Lewis . | |
| 5,521,892 | 5/1996 | Suzuki et al. | ......................... 360/44.29 |
| 5,602,689 | 2/1997 | Kadlec et al. | ........................ 360/78.09 |

*Primary Examiner*—Nabil Hindi
*Attorney, Agent, or Firm*—Robert E. Bushnell, Esq.

[57] ABSTRACT

An automatic servo control gain compensation technique for a hard disk drive for minimizing the deterioration of the performance of a control system, while designing the control system to have a compensation adaptive capacity for variations of external variables includes: (a) receiving an input of a seek command, inputting a position signal varied according to movement of a head, and obtaining a current position and a current velocity by calibration, and finally obtaining a velocity error; (b) accumulating a value in the velocity obtained in step (a) and checking whether or not a seek distance by a seek command is within a proper range; (c) when checked at step (b) that the seek distance by the seek command is within the proper range, varying a control gain to be adapted to the characteristic variation by using the calibrated velocity error; (d) checking whether or not a current seek distance corresponds to a distance sufficient to obtain the error required for performing the automatic compensation depending on the variations of the control gain obtained in step (c); (e) checking whether or not the sum of the velocity obtained in step (a) exceeds a reference value, and then, upon the sum thereof exceeding the reference value, determining whether or not the system is to be updated; (f) storing a current target cylinder number from the result obtained in step (e), setting a clock during the automatic compensation, calibrating the characteristic variations of the control system, and adjusting the seek to update the control system; and (g) returning to the target cylinder stored and setting a flag.

8 Claims, 5 Drawing Sheets

AUTOMATIC SERVO CONTROL GAIN COMPENSATION TECHNIQUE FOR HARD DISK DRIVE

CLAIM OF PRIORITY

This application makes claims all benefits accruing under 35 U.S.C. §119 from an application for SERVO CONTROL GAIN AUTOMATIC COMPENSATION METHOD IN HARD DISK DRIVE earlier filed in the Korean Industrial Property Office on 27 Nov. 1995 and there duly assigned Ser. No. 43969/1995.

BACKGROUND OF THE INVENTION

1. Field of the Invention

The present invention relates to an automatic servo control gain compensation technique for a hard disk drive (hereinafter, referred to as an "HDD") and, in particular, to an automatic servo control gain compensation technique having a compensation adaptive capability for compensating for variations in external variables.

2. Description of the Related Art

In general, now that a servo control of a HDD is designed to use all mechanical variables and variables related to a circuit, variations of the above variables have deteriorated the operation of the overall control of the HDD.

Normally, the servo control of the HDD is accomplished by hardware or a program. Thus, when the control is accomplished by a program, the control program considering design variables (circuit and machine) is stored in a read only memory (hereinafter, referred to as a ROM) of the system. However, since the variation of the variables can vary between HDD's, the above control can not determine the value for satisfying all of the HDDs with the control value of the control program.

In a servo control of a disk recording system, a microprocessor is connected to a programmable read only memory (PROM) and a static random access memory (SRAM). A head moves on the surface of a disk used as recording medium, reading and writing data at a target position on the surface of the disk. A voice coil motor (VCM) which is mechanically attached to the head serves as an actuator and is connected to the head to activate the head in a horizontal direction on the surface of the disk. A VCM driver is connected to the VCM and controls the activation of the VCM in correspondence with a predetermined input current. A digital to analog converter is connected between the microprocessor and the VCM driver. The digital to analog converter receives an input of a digital control input signal from the microprocessor and converts the received signal into an analog signal to provide an analog converted signal to the VCM driver.

A preamplifier is coupled to the head and amplifies a signal read by the head and outputs the amplified signal. Additionally, the preamplifier amplifies an input signal to be written and outputs the amplified input signal to the head. A read decoding and writing encoding element is connected between the microprocessor and the preamplifier. Under the control of the microprocessor, the read decoding and writing encoding element receives an input of data to be written from the microprocessor and encodes the received data into an analog conversion signal and outputs the encoded signal to the preamplifier. The read decoding and write encoding element also decodes an analog detecting signal received from the preamplifier and outputs the decoded result. An analog to digital converter is connected to the read decoding and write encoding element from which the analog to digital converter receives an input of the analog detecting signal. The analog to digital converter converts the analog detecting signal into digital data, that is, a position error signal (PES) and outputs the PES to the microprocessor.

To compensate for the differences of the control values in every respective HDD caused by the variation of the design variable in the HDD constructed as stated above, the compensation of the variations of external variables whenever the power increases when the HDD is initially manufactured or after producing each product has been performed. Thus, there has been used a method for compensating for the variable variations due to the external cause for respective HDDs through the above two methods. Hence, the variation of the HDD can be compensated for; however, it has no effect on variations of variables due to the increment of the temperature due to usage of the HDD for a long time. Also, to compensate for the above variation of the temperature, the control system has to need a compensation adaptive capacity for variations of the external variables. As well, all of compensating processes performed under operation should be performed within a rapid time lest the performance of the total control system should be deteriorated negatively.

The following U.S. patents each disclose various automatic servo gain control compensation techniques for disk drives. However, none of these patents teaches or suggests the specific technique of the present invention: U.S. Pat. No. 5,510,939 to Lewis, entitled Disk Drive With Adaptive Positioning, U.S. Pat. No. 5,436,577 to Ohshima, entitled Method For Controlling The Gain Of A Tracking Servo Circuit, U.S. Pat. No. 5,416,759 to Chun, entitled Variable Gain Digital Servo System With Improved Resolution And Reduced Quantization Error, U.S. Pat. No. 5,399,849 to Jung, entitled Focusing Control Apparatus For An Optical Disk System Employing A Gain Adjusted And Phase Compensated Error Signal, U.S. Pat. No. 5,347,502 to Yamada et al., entitled Focusing Control System For Use In An Information Recording And Reproducing Apparatus, U.S. Pat. No. 5,293,365 to Rokutan, entitled Track Control Circuit For Optical Card Recording/Reproducing Apparatus, U.S. Pat. No. 5,124,967 to Isaka et al, entitled Automatic Gain Control Method And Apparatus In Optical Disk System, U.S. Pat. No. 5,107,479 to Tsuyuguchi et al., entitled Optical Recording/Reproducing Apparatus, U.S. Pat. No. 4,616,353 to Kaneda et al., entitled Tracking Servo With Closed Loop Gain Correction, and U.S. Pat. No. 4,611,317 to Takeuchi et al., entitled Optical Disk Apparatus.

SUMMARY OF THE INVENTION

It is therefore an object of the present invention to provide an automatic servo control gain compensation technique for minimizing the deterioration of the performance of a control system, while designing the control system to have a compensation adaptive capacity for variations of external variables.

The above object can be achieved according to the present invention with an automatic servo control gain compensation technique for a hard disk drive, comprising: (a) receiving an input of a seek command, inputting a position signal varied according to movement of a head due to the seek operation, and obtaining a current position and a current velocity by calibration, and finally obtaining a velocity error; (b) receiving a current position value and obtaining the velocity error for every servo sample, and then accumulating the velocity error; (c) when checked at step (b) that a seek distance servo sampled by a seek command is within a the proper range, varying a control gain to be adapted to the characteristic variation by using the calibrated velocity error; (d) checking whether or not the automatic compensation is currently performed depending on the variations of the control gain obtained in step (c), and then when the automatic compensation is not performed, checking whether or not a current seek distance corresponds to a distance sufficient to obtain the error required for performing the automatic compensation; (e) checking whether or not the sum of the velocity obtained in step (b) exceeds a reference value, and then, upon the sum thereof exceeding the reference value, determining whether or not the system is to be updated; (f) storing a current cylinder number when the system is determined to be updated in step (e), setting a flag during the automatic compensation, calibrating the characteristic variations of the control system, and performing the seek within an adjusting distance to update the control system; and (g) returning to the target cylinder stored and setting a flag.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENTS

Figure 1:
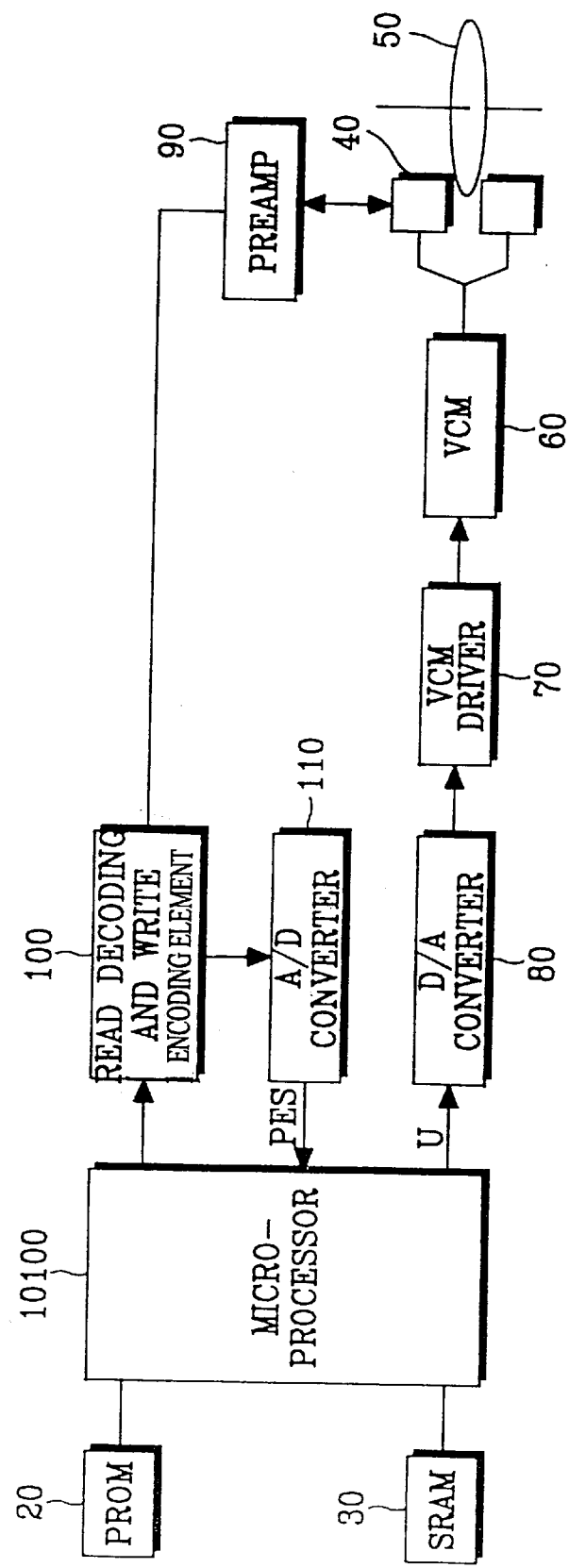
FIG. 1 is a diagram related to the servo control of a disk recording system.

FIG. 1 is a diagram illustrating the servo control related to a disk recording system in order to explain an embodiment of the present invention.

In connection with FIG. 1, a microprocessor 10100 is connected to a programmable ROM 20 (hereinafter, referred to as a PROM) and a static random access memory 30 (hereinafter, referred to as a SRAM). A head 40 moves on the surface of a disk 50 used as a recording medium, reading and writing data at a target position on the surface of the disk 50. A voice coil motor 60 (hereinafter, referred to as a VCM) which is mechanically attached to the head 40 serves as an actuator and is connected to the head 40 to activate the head 40 in the horizontal direction on the surface of the disk 50. A VCM driver 70 is connected to the VCM 60 and controls the activation of the VCM 60 in correspondence with a predetermined input current. A digital/analog converter 80 (hereinafter, referred to as a D/A converter) is connected between the microprocessor 10100 and the VCM driver 70. The D/A converter 80 receives an input of a digital control input signal U from the microprocessor 10100 and converts the received signal into an analog signal to provide an analog-converted signal to the VCM driver 70.

A preamplifier 90 is coupled to the head 40, and amplifies a signal read by the head 40 and outputs the amplified signal. Additionally, the preamplifier 90 amplifies an input signal to be written and outputs the amplified input signal to the head 40. A read decoding and write encoding element 100 is connected between the microprocessor 10100 and the preamplifier 90. Under the control of the microprocessor 10100, the read decoding and write encoding element 100 receives an input of data to be written from the microprocessor 10100 and encodes the received data into an analog flux conversion signal and outputs the encoded signal to the preamplifier 90. Also, the read decoding and write encoding element 100 decodes an analog detecting signal received from the preamplifier 90 and outputs the decoded result. An analog/digital converter 100 (hereinafter, referred to as an A/D converter) is connected to the read decoding and write encoding element 100, from which the A/D converter 110 receives an input of the analog detecting signal. The A/D converter 100 converts the analog detecting signal into digital data, that is, a position error signal (hereinafter, referred to as a PES), and outputs the PES to the microprocessor 10100.

In the construction as described above, the microprocessor 10100 loads an estimator program and a predetermined control program therein, and executes the overall control operation in the servo control apparatus in the disk recording system.

Figure 2:
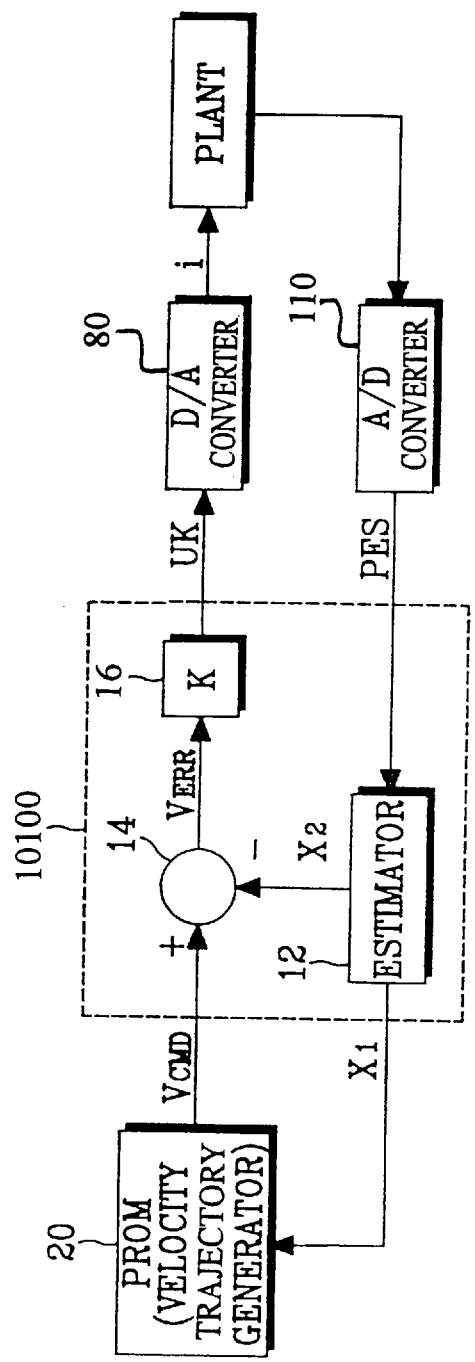
FIG. 2 is a block diagram illustrating the servo control apparatus of a disk recording system.

FIG. 2 is a block diagram illustrating the servo control apparatus of a disk recording system, wherein the PROM 20 used as a velocity trajectory generator stores velocity command data obtained from the velocity command trajectory at discrete values of the moving distance.

To compensate for the differences of the control values in every respective HDD caused by the variation of the design variable in the HDD constructed as stated above, the compensation of the variations of external variables whenever the power increases when the HDD is initially manufactured or after producing each product has been performed. Thus, there has been used a method for compensating for the variable variations due to the external cause for respective HDDs through the above two methods. Hence, the variation of the HDD can be compensated for; however, it has no effect on variations of variables due to the increment of the temperature due to usage of the HDD for a long time. Also, to compensate for the above variation of the temperature, the control system has to need a compensation adaptive capacity for variations of the external variables. As well, all of compensating processes performed under operation should be performed within a rapid time lest the performance of the total control system should be deteriorated negatively.

Figure 4:
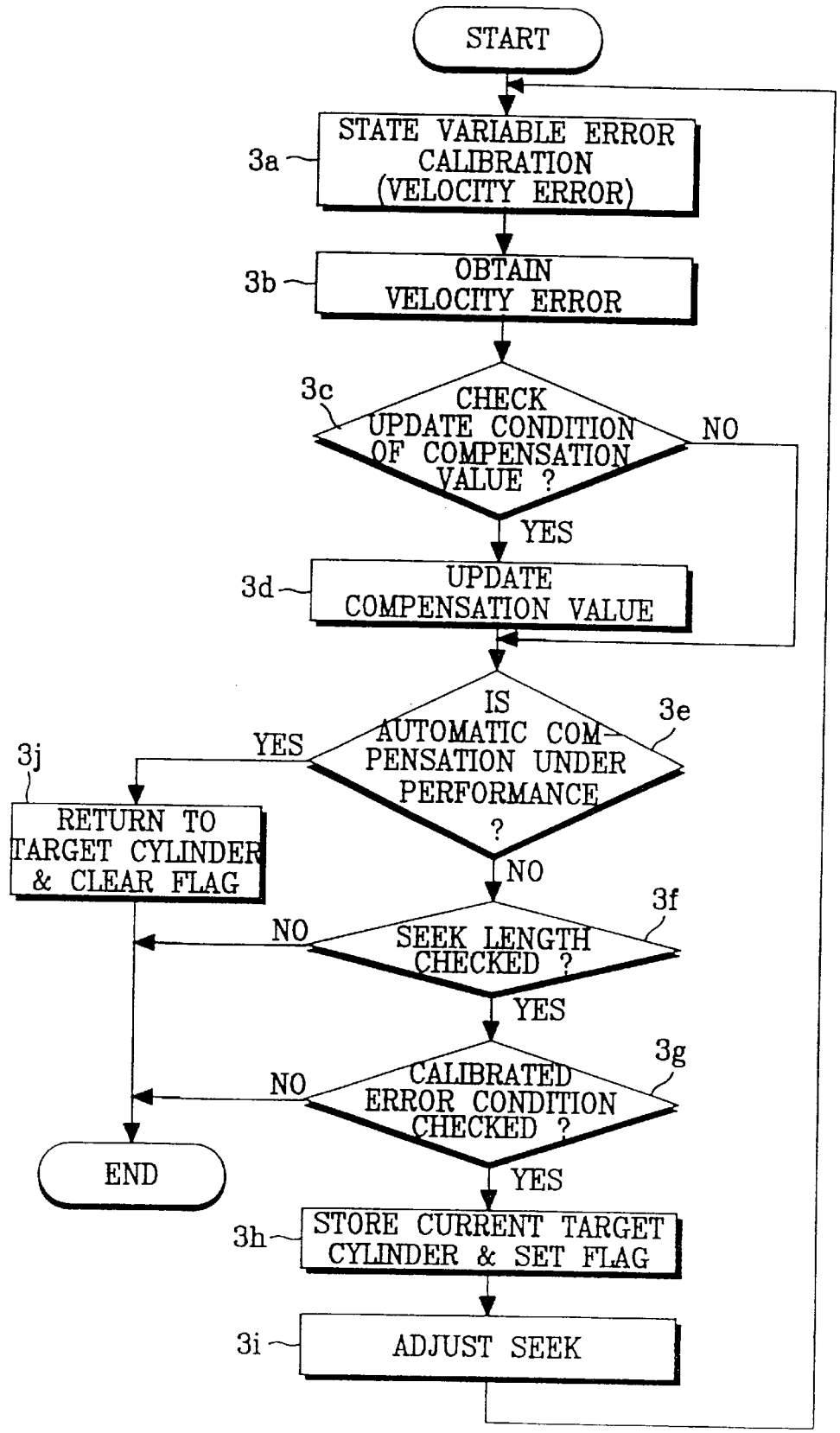
FIG. 4 is a flowchart illustrating the servo control automatic gain compensation method for variations of the external variables.

FIG. 4 is a flowchart illustrating the automatic servo control gain compensation method for variations of the external variables, which is comprised of the steps of: (a) receiving an input of a seek command, inputting a position signal varied according to movement of a head, and obtaining a current position and a current velocity by calibration, and finally obtaining a velocity error; (b) accumulating a value in the velocity obtained in step (a) and checking whether or not a seek distance by the seek command belongs to a proper range; (c) when checked at step (b) that the seek distance by the seek command belonged to the proper range, varying a control gain to be adapted to the characteristic variation by using the calibrated velocity error; (d) checking whether or not a current seek distance corresponds to a distance enough to obtain the error required for performing the automatic compensation depending on the variations of the control gain obtained in step (c); (e) checking whether or not the sum of the velocity obtained in step (a) exceeds a reference value, and then, upon the sum thereof exceeds the reference value, calibrating whether or not the system is updated; (f) storing a current target cylinder number from the result obtained in step (e), setting a clock during the automatic compensation, calibrating the characteristic variations of the control system, and adjusting the seek to update the control system; and (g) during the non-automatic compensation, returning to the target cylinder stored or setting a flag.

Figure 3:
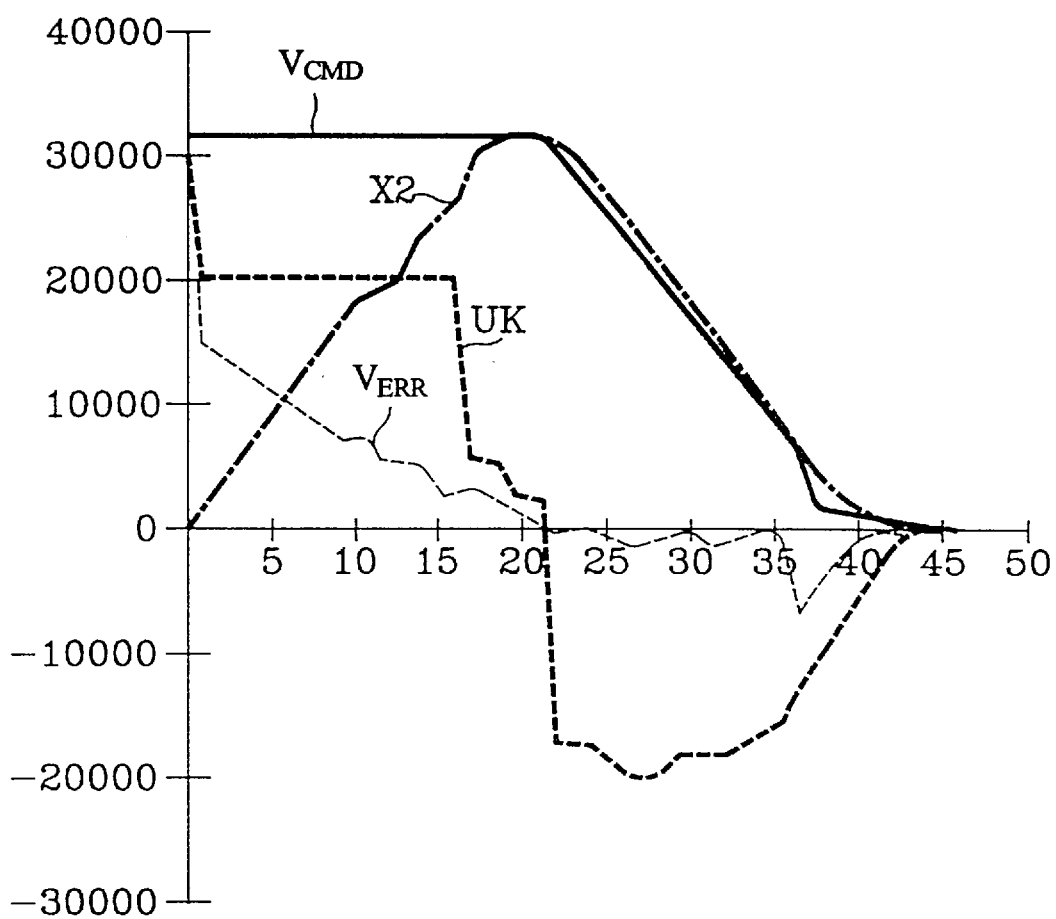
FIG. 3 is a view illustrating an operational characteristic of FIG. 2.

FIG. 3 is a diagram illustrating the characteristics of the operation of FIG. 2.

Therein, $V_{CMD}$ is designated as a waveform showing the characteristic of the velocity command, X2 is designated as a waveform showing the characteristic of the estimated head velocity, UK is designated as a waveform showing an output of current, and $V_{ERR}$ is designated as a waveform showing the read characteristic of the velocity error.

Therefore, a detailed embodiment of the present invention can be concretely described hereinafter with reference to FIGS. 3 and 4.

The servo control according to the present invention reads a servo signal from the disk to the head, to obtain a current position X1 and a current velocity X2 of the head being moved from an estimator 12 by using the PES which is provided by converting the read signal in the A/D converter 110, to compare in subtractor 14 the current velocity X2 with the velocity command $V_{CMD}$ generated by using the current position X1, to compensate the difference between the current velocity X2 and the velocity command Vcmd by a control constant K in multiplier 16 as an error $V_{ERR}$, and to generate the output current value UK. At this time, when the difference between an value obtained via the estimator 12 and a value obtained as the real obtained result is accumulated, a standard value of the variations expected upon normal operation state can be obtained. Whenever the HDD mechanically moves after storing the standard value, that is to say, whenever the dynamic variations of the HDD are generated, the characteristic variations of the system can be sensed from the difference between the standard value and the calibrated value after calibrating the variation. Also, once the amount of a gain G for compensation of the above value is designated to be varied, the system can have the compensation adaptive capacity. Hence, there are two techniques for sensing and compensating for the variations in the present invention.

Firstly, in the event that the dynamic variations are generated within a specific range and the value calibrated thereby can be compensated enough, the current calibrated value is directly used in the gain compensation. The above method is performed without any influence on operation of the overall control system (with no deterioration in performance thereof) and the overall control system goes to more stabilized state through the above compensation operation.

Secondly, when the largely generated difference between the calibrated variation and the expected value exceeds the reference value, it is checked that the compensation is needed, thereby to perform the calibration for compensation at the same time of performing a head moving seek command. Here, while time delay may be dispensably occur due to this, the stability can be advantageously ensured on the performance of the total control system.

Figure 5:
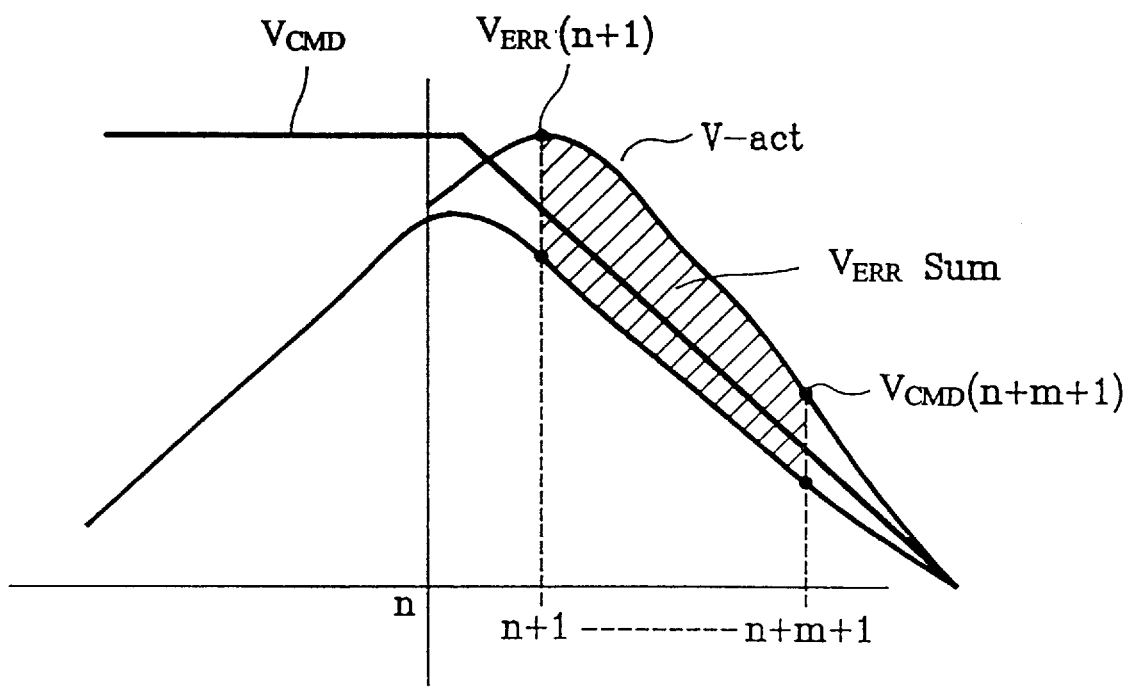
FIG. 5 is a diagram illustrating the operational characteristics according to the present invention.

Referring to FIGS. 4 and 5, the servo control automatic gain compensation according to the present invention will be more concretely explained hereinafter.

Considering FIG. 4, when the seek operation is started upon receipt of application of the seek command from the host, the microprocessor 101001 controls the VCM driver 70 through the D/A converter 80, and when the current is applied to the VCM 60, the head 40 moves. At step 3a, if the PES varied in accordance with movement of the head 40 is inputted to the microprocessor 101001 through the preamp 90, the read decoding and write encoding element 100, and the A/D converter 110, the microprocessor 10100 obtains the current position X1 and the current velocity X2 by estimation thereof. The microprocessor 101001 obtains the velocity error by the difference between the current velocity X2 estimated in the microprocessor (estimator 12) and the velocity command generated from the velocity trajectory generator with receiving an input of the current position X1. Therein, after accumulating the velocity error calibrated at every servo sample at step 3b, the microprocessor 101001 checks, at step 3c, whether or not the seek distance by the seek command belongs to the proper range as in the following expression (1).

$$\text{⅓ of Max seek distance} \leq \text{Current seek distance} \leq \text{Max seek distance} \quad (1)$$

In the event that the seek of proper distance satisfied at step 3c was performed, the microprocessor 101001 varies a control gain G in order to be adapted in accordance with the characteristic variations of the control system by using the accumulated velocity error sum in the following expression (2).

$$G(\text{Gain}) = G + (\text{Reference Value} - \text{Velocity Error Sum} \times \text{scale factor}) \quad (2)$$

As can be seen from the above expression (1), while the compensation value is updated as the control gain G, the microprocessor 101001 checks whether or not the current seek is automatically under compensation, and since data is unreliable in the case that the seek of the proper distance is not performed, it is checked whether or not the current seek is under automatic compensation.

When checked, at step 3e, that the current seek was automatically under compensation, the microprocessor 101001 returns from the target cylinder written at step 3j and clears the flag. However, when checked, at step 3e, that the current seek was not automatically under compensation, the microprocessor 101001 checks, at step 3f, whether or not the current seek distance is adequate to obtain the error required for automatically performing compensation, as illustrated in the following expression (3).

$$\text{¼ of Max Seek Distance} \leq \text{Current Seek Distance} \leq \text{Max Seek Distance} \quad (3)$$

Satisfied with aforesaid expression (3), the microprocessor 101001 checks, at step 3g, whether or not the sum of the velocity errors calibrated at step 3b exceeds the reference value and whether or not the system is necessarily updated, as shown in the following expression (4).

$$|\text{Reference Value}(rV) - \text{Velocity Error}(VE)| > \text{Reference Value}(rl) \quad (4)$$

When the calibrated error is satisfied, at step 3h, the microprocessor 10100 stores the current target cylinder number and sets the flag during the automatic compensation. Following that, at step 3i, the system performs the seek as the updating proper distance by calibrating the characteristic variations, which can be seen from the following expression (5).

$$\text{⅓ of Max Seek Distance} \leq \text{Proper Distance} \leq \text{Max Seek Distance} \quad (5)$$

As may be apparent from the foregoing, a servo control gain automatic compensation method of the system having a compensation adaptive capacity for variations of external variables according to the present invention has an effect in minimizing the deterioration of the performance of the system and improving the stability of the system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment discloses as the best mode contemplated for carrying out the present invention, but that the present invention includes all embodiments failing within the scope of the appended claims.

What is claimed is:

1. An automatic servo control gain compensation method of a hard disk drive, comprising the steps of:

(a) receiving an input of a seek command, inputting a position signal varied according to movement of a head, and obtaining a current position and a current velocity by calibration, and finally obtaining a velocity error;

(b) accumulating said velocity error obtained in step (a) and checking whether or not a seek distance by a seek command is within a proper range;

(c) when checked at step (b) that said distance by said seek command is within said proper range, varying a control gain to be adapted to a characteristic variation of a control system by using said velocity error;

(d) checking whether of not a current seek distance corresponds to a distance is sufficient to obtain said error required for performing automatic compensation depending on said variations of said control gain obtained in step (c);

(e) checking whether or not the sum of said velocity error obtained in step (a) exceeds a reference value, and then, upon said sum thereof exceeding said reference value, determining whether or not said control system is to be updated;

(f) storing a current target cylinder number based on result obtained in step (e), setting a clock during said automatic compensation, determining said characteristic variations of said control system, and adjusting said seek to update said control system; and (g) returning to said stored current target cylinder and setting a flag.

2. An automatic servo control gain compensation of hard disk drive as recited in claim 1, wherein said seek distance is within a proper range in step (b) if it is between a predetermined maximum seek distance value and one third of the predetermined maximum seek distance value.

3. An automatic servo control gain compensation method of a hard disk drive as recited in claim 1, wherein said seek distance in step (d) is sufficient if it is in a range between a predetermined maximum seek distance and one quarter of the predetermined maximum seek distance.

4. An automatic servo control gain compensator for a hard disk drive, comprising:

a receiving means for receiving an input of a seek command, inputting a position signal varied according to movement of a head, and obtaining a current position and a current velocity by calibration, and finally obtaining a velocity error;

a means for accumulating said velocity error and a first checking means for checking whether or not a seek distance by a seek command is within a proper range;

a control gain varying means for varying a control gain to be adapted to a characteristic variation of a control system by using said velocity error when the first checking means has checked that said seek distance by said seek command is within said proper range;

a second checking means for checking whether or not a current seek distance corresponds to a distance is sufficient to obtain said error required for performing automatic compensation depending on said variations of said control gain obtained by the control gain varying means;

a third checking means for checking whether or not the sum of said velocity error obtained by the receiving means exceeds a reference value, and then, upon said sum thereof exceeding said reference value, determining whether or not said control system is to be updated;

a storage means for storing a current target cylinder number based on result obtained by the third checking means, setting a clock during said automatic compensation, determining said variations of said control system, and adjusting said seek to update said control system; and a means for returning to said stored current target cylinder and setting a flag.

5. An automatic servo control gain compensation method of a hard disk drive as recited in claim 2, wherein said seek distance in step (d) is sufficient if it is in a range between a predetermined maximum seek distance and one quarter of the predetermined maximum seek distance.

6. An automatic servo control gain compensator for a hard disk drive as recited in claim 4, said first checking means determining that said seek distance is within a proper range if it is between a predetermined maximum seek distance value and one third of the predetermined maximum seek distance value.

7. An automatic servo control gain compensator for a hard disk drive as recited in claim 4, said second checking means determining that said seek distance is within a proper range if it is between a predetermined maximum seek distance value and one quarter of the predetermined maximum seek distance value.

8. An automatic servo control gain compensator for a hard disk drive as recited in claim 6, said second checking means determining that said seek distance is within a proper range if it is between a predetermined maximum seek distance value and one quarter of the predetermined maximum seek distance value.

* * * * *